Feb. 22, 1955     H. J. RIBLET     2,702,884
ADJUSTABLE POWER DIVIDER WITH DIRECTIONAL COUPLING
Filed Sept. 27, 1949     2 Sheets-Sheet 1

INVENTOR
HENRY J. RIBLET
BY
ATTORNEY

INVENTOR
HENRY J. RIBLET
BY
ATTORNEY 2,702,884
Patented Feb. 22, 1955

United States Patent Office

2,702,884

ADJUSTABLE POWER DIVIDER WITH DIRECTIONAL COUPLING

Henry J. Riblet, Belmont, Mass., assignor to Raytheon Manufacturing Company, Newton, Mass., a corporation of Delaware Application September 27, 1949, Serial No. 118,175

9 Claims. (Cl. 333—7)

This application relates to electrical wave energy translation devices, and more particularly to wave guide structures adapted to receive power in at one point, and produce power out at a plurality of other points.

In copending application Serial No. 784,277, filed November 5, 1947, now Patent No. 2,632,809, dated March 24, 1953, there is shown and described a wave guide structure known as a directional coupler. This structure comprises a main wave guide having an input and output and a side wave guide adjacent to said main wave guide and having one wall common with said main wave guide. This common wall has a plurality of apertures therein to allow energy propagated in the main wave guide to pass through into the side wave guide, the amount of energy passing therethrough being subtracted from the energy output of the main wave guide. It was disclosed therein that the power transferred from the main guide to the side guide varied as a function of the number of apertures in the common wall.

Applicant has now discovered that by moving the position of apertures in the common wall the power transferred from the main guide to the side guide may be varied. Since this movement may be gradual and since there are no extremely sharp discontinuities in the field patterns within the guides, a plot of the variation of the relative output of the main and side guides with respect to the position of the apertures will produce a relatively smooth curve. This provides a means whereby the power output from one terminal of the device may be varied in a smooth curve, such that it could, for example, be calibrated for a constant power input in the main guide, and thereby serve as a variable calibrated power source of high frequency energy useful in many fields of experimentation and measurement.

A particular structure which may be used to carry out this invention will now be described in detail, reference being had to the accompanying drawings wherein.

Figures 1, 4:
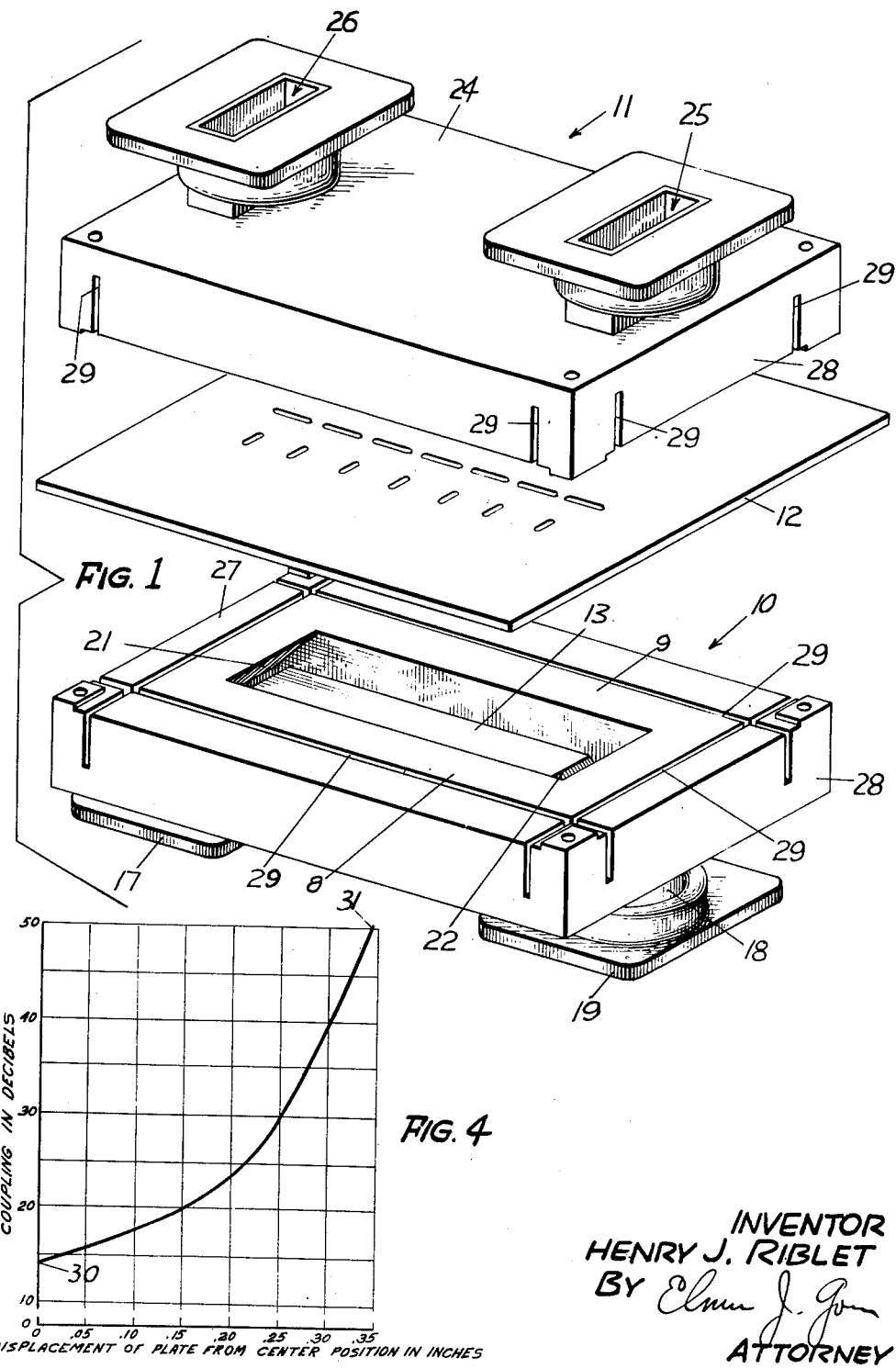
Fig. 1 illustrates an exploded perspective view of a structure utilizing this invention.
Fig. 4 illustrates a curve disclosing operational characteristics of the device.
Figure 2:
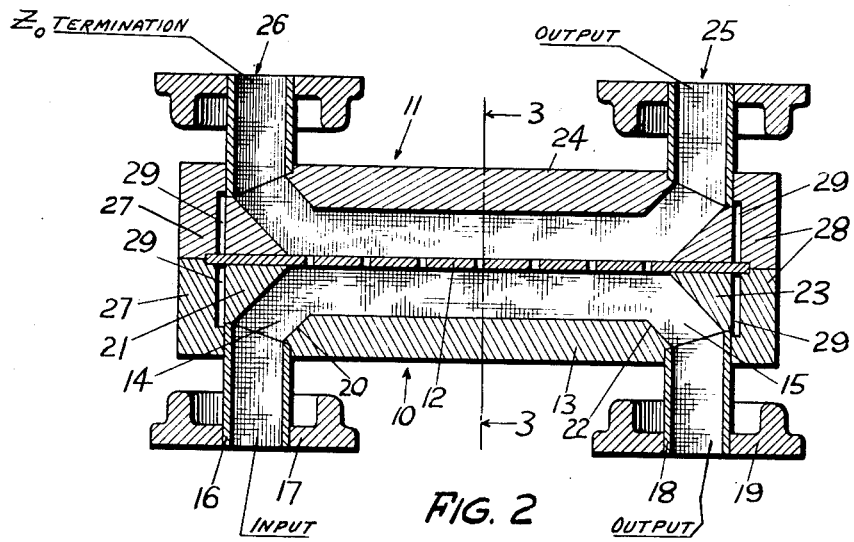
Fig. 2 represents a longitudinal cross-sectional view of the structure shown in Fig 1 taken along line 2—2 of Fig. 3.
Figure 3:
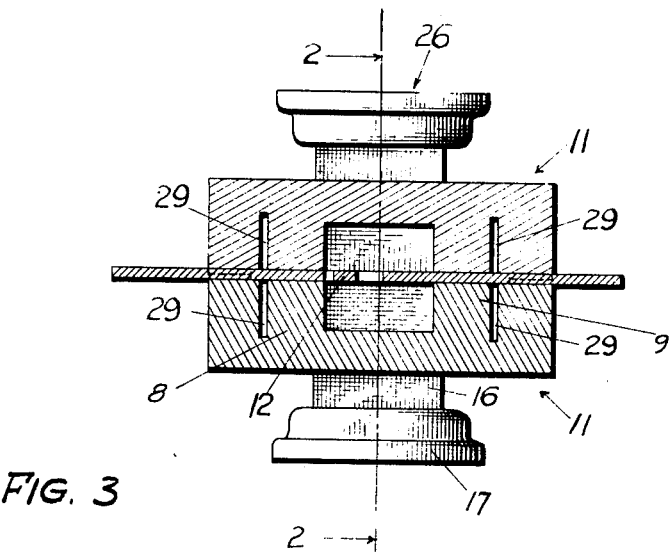
Fig. 3 illustrates a transverse cross-sectional view of the structure shown in Fig. 2 taken along line 3—3 of Fig. 2.

Referring now to Figs. 1, 2 and 3 there is shown a device comprising a lower wave guide structure 10, an upper wave guide structure 11 and a common wall 12 therebetween. While the upper and lower wave guide structures as shown in the drawings are substantially identical and could be interchanged, for the purposes of description in this application the lower wave guide structure will be termed the main guide and the upper wave guide structure will be termed the side guide. The main guide comprises two vertical sides 8 and 9 and a lower side 13 having two openings 14 and 15 therein adjacent the ends thereof.

Into opening 14 which is rectangular and of substantially the same cross section as the main portion of the guide, there extends an input wave guide 16 whose axis, as shown here, is perpendicular to the axis of the main guide. The lower end of input guide 16 terminates in a flange 17 which is adapted to be attached as by screws or bolts to a similar flange on another section of wave guide, not shown, which may be attached to a source of high-frequency power.

The opening 15 has therein a wave guide 18 similar to guide 16 which terminates in a flange 19 similar to flange 17, and is adapted to couple output energy to any desired output load. In order to avoid right angle bends in the wave guide structure, for example, between input guide 16 and main guide 10, the lower side 13 has been chamfered at an angle of 135° with the surfaces of both guides 16 and 10 as at 20 on the side of opening 14 which is furthest from the end of lower guide 10 adjacent opening 14. Also, a metal fillet 21 extends between the side of hole 14 closest to the adjacent end of guide 10 and the common wall 12, the exposed surface of said fillet lying in a plane which makes an angle of 135° with both the axes of guides 10 and 16 and which, therefore, is parallel to the chamfered cut made on lower wall 13. This, in conjunction with the vertical side walls of guide 10, produces a short section of wave guide at 45° angles to the input guide 16 and the main guide 10 which eliminates the sharp right angle turn and thereby reduces losses in the guide.

The output guide 18 is joined to the main guide 10 by a chamfered cut 22 and fillet 23 similar to those described in connection with input guide 16.

The upper guide 11, as previously stated, is similar to lower guide 10 having an upper wall 24 thereof corresponding to the lower wall of main guide 13. An opening 25 to the side guide 11 which is directly above output guide 18 is used as a second output, while an opening 26 directly above guide 16 is normally terminated in a matched impedance $Z_0$, and has substantially no power fed thereto.

The common wall 12 between the main guide structure 10 and the side guide structure 11 is movable with respect thereto. This is done by making the wall 12 in the form of a flat plate which extends outwardly beyond the vertical sides of main and side guides 10 and 11. The common wall 12 also extends slightly beyond the input and output guides 16 and 18, but is covered by end caps 27 and 28 which close the ends of the guides 10 and 11.

Since common wall 12 is movable with respect to main and side guides 10 and 11, it, therefore, necessarily has small cracks at its junctions with the walls of the guides which allows the escape of energy from within the guides. To prevent the escape of energy through said cracks, a wave trap is built into the walls of the wave guides at their junctions with common wall 12. This wave trap comprises slots 29 cut into the walls of the wave guides, for example, in end plates 27 and 28 and the side walls 8 and 9 of the wave guides, said slots being perpendicular to common wall 12 and having a depth on the order of a quarter wave length of the desired operating frequency. The distance of the slots from the interior surfaces of the wave guides along common wall 12 is also made on the order of a quarter wave length of the desired operating frequency. This operates as a two-stage filter section whose effect is to present a high impedance to the wave energy attempting to enter the small cracks between common wall 12 and the other portions of the wave guide structure.

As previously stated, common wall 12 has therein a plurality of apertures. These may be of any desired shape whose coupling varies with their position in the common wall. For example, a plurality of slots may be cut in common wall 12, each set of slots comprising a slot whose longitudinal axis is parallel to longitudinal axes of the main and side guides, and a slot whose longitudinal axis is transverse to the longitudinal axes of the main and side guides. In their position of maximum coupling the slots are placed such that their longitudinal axes are transverse to the currents induced in the common wall 12 by energy in the guide.

For energization of the guides in the $TE_{0,1}$ mode, the slot whose longitudinal axis is parallel to the axes of the main and side guides will be adjacent a side of the wave guide perpendicular to the common wall while the slot whose longitudinal axis is transverse to the axes of the main and side guides will be substantially centered on the center lines of said guides. As is more completely described in the aforementioned copending application, the interruptions of current flow in the wall surface by the slots create substantial electromagnetic fields about said slots whereby energy is coupled through the slots from the main wave guide to the side wave guide. A feature of this type of coupling is that energy coupled into the side guide is propagated substantially in one direction only in the side guide.

For example, if energy is fed into guide 16, a portion thereof flows out of output guide 18, and the remaining energy, which is coupled through the common wall 12, will be propagated toward terminal 25, thus producing a directional coupling.

By increasing the number of sets of slots, the degree of coupling may be increased to any desired amount. If the slots are moved by movement of the common wall 12 such that the slots whose longitudinal axes are parallel to the axes of the guides are centered about the center lines of the guides and the slots whose longitudinal axes are transverse to the axes of the guides are positioned adjacent the side walls of the guides, the slots will cut very few current lines and, therefore, produce very small magnetic fields with the resultant low degree of coupling between the guides. At intermediate positions of the slots, intermediate degrees of coupling are achieved such that the power coupled into the side guides may be varied smoothly.

Referring now to Fig. 4, there is shown a graph illustrating the relationship between coupling from the main to side guide and the displacement of the common wall plate 12 from the position of maximum coupling.

Along the abscissa of the graph is plotted coupling in decibels, where said coupling is defined as power out of the main guide divided by power out of the side guide. Along the ordinate there is plotted displacement of the common wall plate 12 from the center position in inches, where the center position corresponds to the position of maximum coupling. For seven sets of slots, taken herein as a representative example, maximum coupling will be approximately 9 decibels as shown by point .30 on the curve of Fig. 4, while, when the plate is moved approximately .34 inch from its center position, the coupling increases to 50 decibels as shown by point .31 on the graph.

Furthermore, over substantial portions of the curve, for example, from displacements of 0 to .1 and from .25 to .34, the curve approaches substantial linearity, and these portions of the curves may be used for producing an amplitude modulation to the power output by means of a mechanical movement of plate 12.

This completes the description of the specific embodiment of the invention illustrated and described herein. However, many modifications thereof will be apparent to persons skilled in the art without departing from the spirit and scope of this invention. For example, other apertures besides slots could be used and the slots could be moved longitudinally of the wave guide to produce coupling variations in rather discrete steps. Also, other wave guide configurations and modes of propagation of energy therein may be used if desired. Therefore, applicant does not wish to be limited to the particular embodiment of the invention illustrated herein except as defined by the appended claims.

What is claimed is:

1. An energy transfer system comprising a pair of electromagnetic walled wave guides having a common side wall, said wall containing directional coupling apertures therein for the passage of energy therethrough, said wall being movable parallel to the plane of said wall to vary the position of said apertures in said wall relative to the position of energy patterns in said guides.

2. An electromagnetic wave energy transfer system having input and output means associated therewith, said system comprising a pair of electromagnetic walled wave guides having a common wall, said wall containing directional coupling apertures therein for the passage of energy therethrough, said output means comprising a plurality of paths including a separate energy discharge path fed by each of said guides and means for varying the relative power fed to said paths as a continuous function of the position of said apertures comprising means for moving said wall.

3. An electromagnetic wave guide directional coupler comprising a pair of electromagnetic walled wave guides having a common wall portion movable parallel to the plane of said wall portion substantially parallel to the axes of said guides, said wall containing directional coupling apertures therein for the passage of energy therethrough.

4. An electromagnetic wave guide directional coupler comprising a pair of electromagnetic walled wave guides having a common wall movable in the plane thereof, said wall containing mutually perpendicular slots therein for the passage of energy therethrough.

5. An electromagnetic wave guide directional coupler comprising a pair of electromagnetic walled wave guides having a common wall, said wall containing apertures therein for the passage of energy therethrough, the axes of said wave guides being substantially parallel to said wall, and said common wall being movable parallel to the plane of said wall in a direction transverse to said axes.

6. An electromagnetic wave guide directional coupler comprising a pair of electromagnetic walled wave guides having a common wall, said wall containing a pair of mutually perpendicular slots therein for the passage of energy therethrough, and means for varying the amount of energy coupled between said guides comprising means for moving said wall containing said slots relative to the energy patterns in said guides.

7. An electromagnetic wave guide directional coupler comprising a pair of electromagnetic walled wave guides having a common wall, said wall containing a pair of mutually perpendicular slots therein for the passage of energy therethrough, the longitudinal axes of said pair of slots intersecting substantially at the center of one slot of said pair of slots, and means for moving said wall containing said slots relative to the energy patterns in said guides and the walls of said guides adjacent thereto.

8. An electromagnetic wave directional coupler comprising a pair of electromagnetic walled wave guides having separate side walls and a common wall, said wall containing substantially mutually perpendicular slots therein for the passage of energy therethrough, said common wall containing said slots being movable from one side wall of said guides to the other side wall of said guides, and means for moving said wall to vary the position of said apertures relative to energy patterns in said guides.

9. A wave guide directional coupler comprising a pair of walled wave guides having a common wall portion transversely movable with respect to the walls of said guides adjacent thereto substantially parallel to the axes of said guides, said wall containing substantially mutually perpendicular slots therein for the passage of energy therethrough.

References Cited in the file of this patent

UNITED STATES PATENTS

| | | |
|---|---|---|
| 1,732,051 | Johnson | Oct. 15, 1929 |
| 2,206,683 | Wolff | July 2, 1940 |
| 2,239,905 | Trevor | Apr. 29, 1941 |
| 2,410,656 | Herold | Nov. 5, 1946 |
| 2,472,785 | Blitz | June 14, 1949 |
| 2,473,274 | Bradley | June 14, 1949 |
| 2,519,734 | Bethe | Aug. 22, 1950 |
| 2,531,777 | Marshall | Nov. 28, 1950 |
| 2,544,715 | Mushmore | Mar. 13, 1951 |
| 2,562,281 | Mumford | July 31, 1951 |
| 2,579,327 | Lund | Dec. 18, 1951 |
| 2,615,982 | Zaslavsky | Oct. 28, 1952 |

OTHER REFERENCES

Publication: A New Type of Waveguide Directional Coupler, by Riblet and Saad, published in "Proceedings of the I. R. E." in January 1948.